United States Patent [19]

Langdon

[11] Patent Number: 5,059,781
[45] Date of Patent: Oct. 22, 1991

[54] ORIENTATION MONITORING APPARATUS

[75] Inventor: Roger M. Langdon, Colchester, United Kingdom

[73] Assignee: GEC-Marconi Limited, Stanmore, United Kingdom

[21] Appl. No.: 585,782

[22] Filed: Sep. 20, 1990

[30] Foreign Application Priority Data

Sep. 20, 1989 [GB] United Kingdom ................ 8921268

[51] Int. Cl.$^5$ ........................ G01N 21/86; G01V 9/04
[52] U.S. Cl. ................................ 250/206.1; 250/561; 356/141
[58] Field of Search ...................... 356/141, 152, 363; 250/561, 206.2, 206.1, 203.1, 203.2

[56] References Cited

U.S. PATENT DOCUMENTS 4,956,794 9/1990 Zeeui et al. ......................... 356/152

Primary Examiner—David C. Nelms
Assistant Examiner—T. Davenport
Attorney, Agent, or Firm—Spencer & Frank

[57] ABSTRACT

The orientation of a helmet is monitored by illuminating the cockpit volume by a moving interference pattern produced by three beams. The sensors detect the varying phase to produce outputs which are compared to determine the orientation of the helmet.

27 Claims, 5 Drawing Sheets

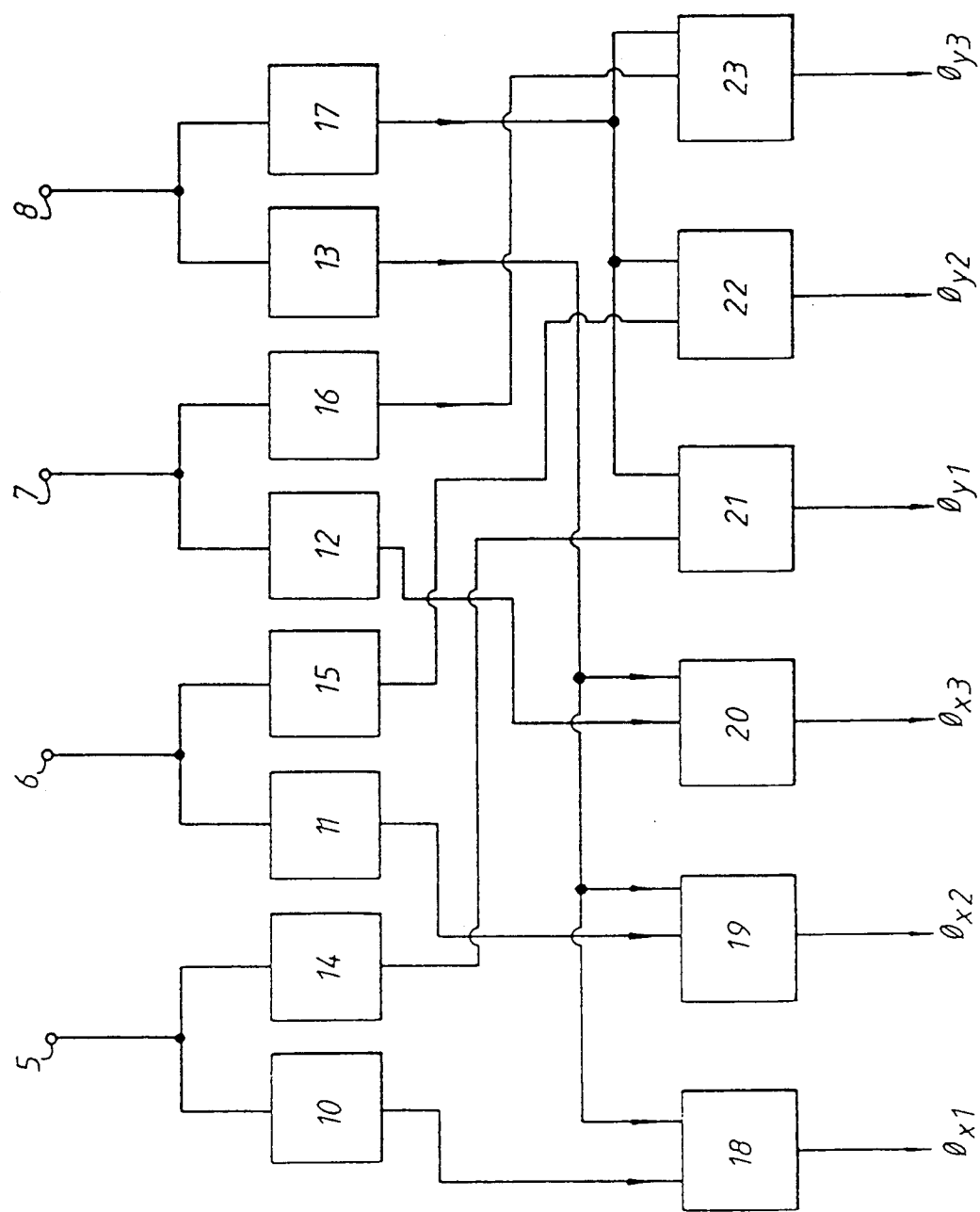

ORIENTATION MONITORING APPARATUS

BACKGROUND OF INVENTION

This invention relates to monitoring the orientation of an object and particularly but not exclusively to an object that is capable of moving in a large volume, such as a pilot's helmet.

In the past, monitoring of the orientation of an object has been carried out by electromechancial sensors such as potentiometers or shaft angle encoders attached to the object. For such devices to be used, it is necessary to attach part of the sensor to the object to move with it and another part to some reference point which is stationary relative to the moving object. This arrangement however limits the movement of the object and cannot be used in some applications where total freedom of movement is required, for example, when monitoring the orientation of a pilot's helmet. Such electromechanical devices are also prone to failure, due to wear.

BRIEF SUMMARY OF THE INVENTION

According to the invention there is provided apparatus for monitoring the orientation of an object comprising means for illuminating the object with a first interference pattern moving in a first direction and a second interference pattern moving in a second direction at an angle to the first direction; an array of sensors arranged to be mounted on the object and to produce outputs in response to the interference patterns and means to derive from the output and known configuration of the array alone, the orientation of the object.

Since the sensors are responsive to moving interference patterns they may be fixed to a helmet, for example, giving excellent freedom of movement. Also they do not have moving parts which makes them more reliable than electromechanical devices and apparatus in accordance with the invention may also be lightweight.

In one advantageous embodiment, the configuration of the array of sensors is a tetrahedron.

Preferably, the interference pattern is produced by three beams of radiation, each beam being of a frequency of radiation different to the others.

Preferably, the sensors are arranged on a sub-assembly but alternatively three sensors may be mounted directly on the object surface with the fourth mounted some distance above it.

BRIEF DESCRIPTION OF THE SEVERAL VIEWS OF THE DRAWING

Specific embodiments of the invention will now be described with reference to the drawings in which:

FIG. 2 is a block diagram of part of the circuitry which is connected to the sensors shown in FIG. 1;

With reference to FIG. 1, three uniphase, monochromatic laser beams 1, 2 and 3 flood a cockpit volume of an aircraft in which a pilot sits wearing a helmet 4. On the helmet 4 is mounted an array of sensors 5, 6, 7 and 8 shown in the Figure as an enlarged portion. The frequency of the laser light is chosen such that there exists a frequency difference $f_x$ between the beams 1 and 2 and a frequency difference $f_y$ between the beams 1 and 3. Beams 1 and 2 propagate in a plane parallel to the plane of the paper, with a small angle between them, whereas beams 1 and 3 propagate in a plane perpendicular to the plane of the paper with a small angle between them. An interference pattern results which because of the frequency differences moves in two planes; the horizontal x plane and the vertical y plane.

Figure 1:
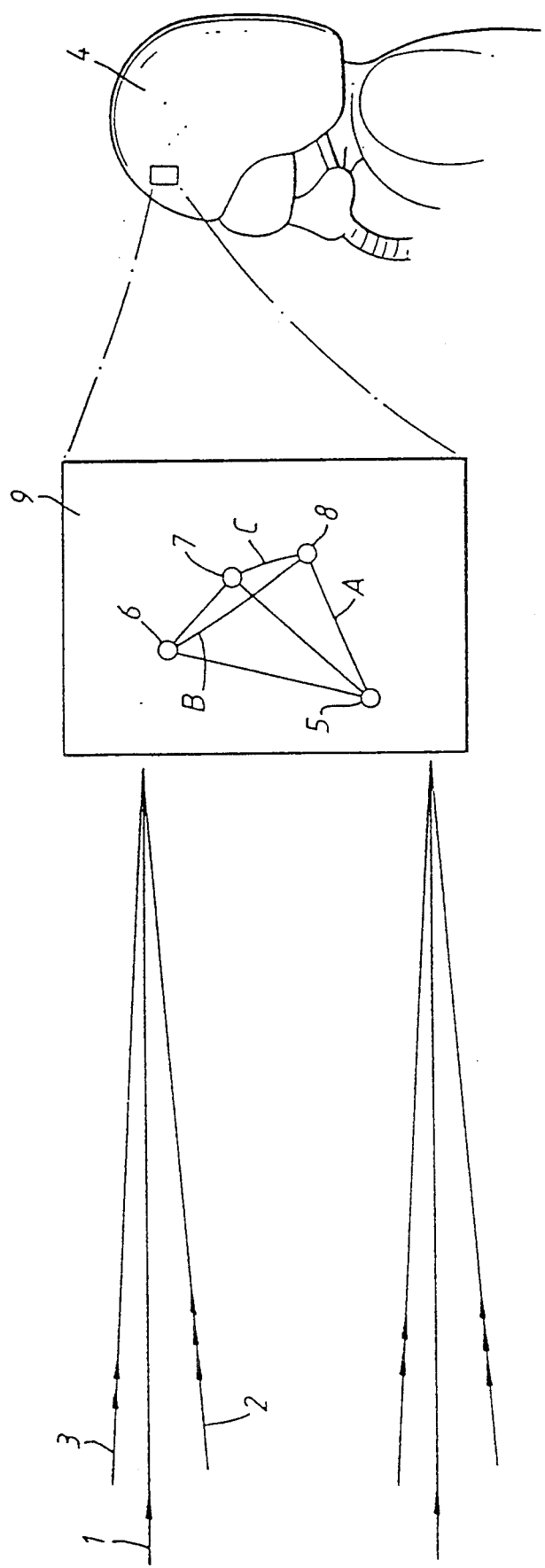
FIG. 1 shows a sensor array in accordance with the invention.

The sensors 5, 6, 7 and 8 are small photodetectors and they are arranged to form a tetrahedron such that sensors 5, 6 and 7 are situated at the vertices of an equilateral triangle, and photodetector 8 is situated at the fourth vertex of the tetrahedron such that the angles subtended at sensor 8 by any pair of the three sensors 5, 6 and 7 are right angles. The four sensors are attached to a small sub-assembly 9 which is fixed as one unit to the helmet 4. Each sensor detects the phase of the moving interference at its position.

Each of the outputs from the four sensors 5, 6, 7 and 8 are filtered through filters 10, 11, 12 and 13 respectively, tuned to frequency $f_x$ and also through filters 14, 15, 16 and 17 respectively, tuned to frequency $f_y$ as shown in FIG. 2. The outputs from filters 10, 11 and 12 are compared in phase with the output from filter 13 in phase detectors 18, 19 and 20 respectively, producing output signals $\phi_{x1}$, $\phi_{x2}$ and $\phi_{x3}$ respectively. The outputs from filters 14, 15 and 16 are compared in phase with the output filter 17 in phase detectors 21, 22 and 23 respectively giving phase output signals $\phi_{y1}$, $\phi_{y2}$ and $\phi_{y3}$ respectively.

The phase angles $\phi_{x1}$, $\phi_{x2}$, $\phi_{x3}$, $\phi_{y1}$, $\phi_{y2}$, $\phi_{y3}$, carry sufficient information to calculate the angular direction of the incoming beams 1, 2 and 3 with respect to the array of sensors 5, 6, 7 and 8. The three mutually perpendicular axes are represented in FIG. 1 by the lines joining the sensors 5 to 8, 6 to 8 and 7 to 8, A, B and C respectively, and it can be shown that the direction of illumination represented by the line of intersection between the plane containing beams 1 and 2, and the plane containing beams 1 and 3 form angles $\theta A$, $\theta B$ and $\theta C$ with respect to the axes is given by $$\cos \theta_A = \gamma[\alpha^2+\beta^2+\gamma^2]^{-\frac{1}{2}}$$

$$\cos \theta_B = \beta[\alpha^2+\beta^2+\gamma^2]^{-\frac{1}{2}}$$

$$\cos \theta_C = \alpha[\alpha^2+\beta^2+\gamma^2]^{-\frac{1}{2}}$$

where $$\alpha = \phi_{x1}\phi_{y2} - \phi_{y1}\phi_{x2}$$

$$\beta = \phi_{x1}\phi_{y3} - \phi_{y1}\phi_{x3}$$

$$\gamma = \phi_{x2}\phi_{y3} - \phi_{y2}\phi_{x3}$$

Insertion of the measured phase angles into the formulae is carried out by a microprocessor (not shown) and enables the angular orientation of the sensor sub-assembly 9 relative to the directions of the incoming laser beams to be calculated and hence the angular orientation of the helmet 4 can be derived. The circuitry for working out the orientation may be mounted on the subassembly 9. This angular orientation is used by the aircraft's computer to determine the direction in which the pilot is looking.

In other embodiments of the invention the sensors 5, 6, 7 and 8 may be in other forms of tetrahedron but of course the mathematical relationships between the angles will be different.

Figure 3A:
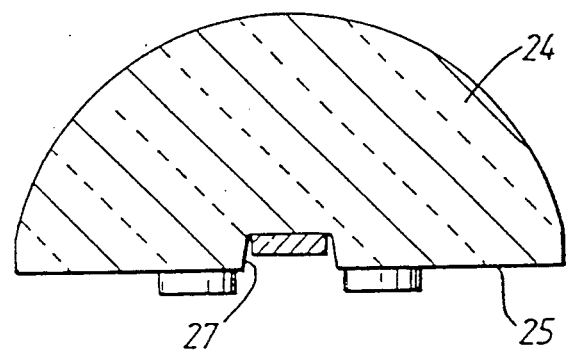
FIG. 3A is a section of a lens and sensor array.
Figure 3B:
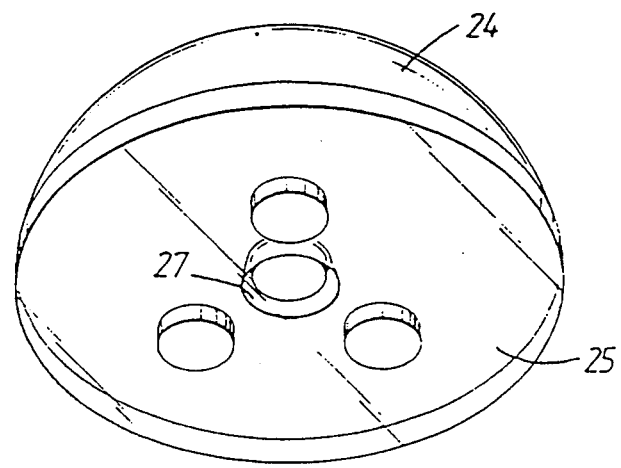
FIG. 3B is a prespective view of the lens and sensors array shown in FIG. 3A.
Figure 4:
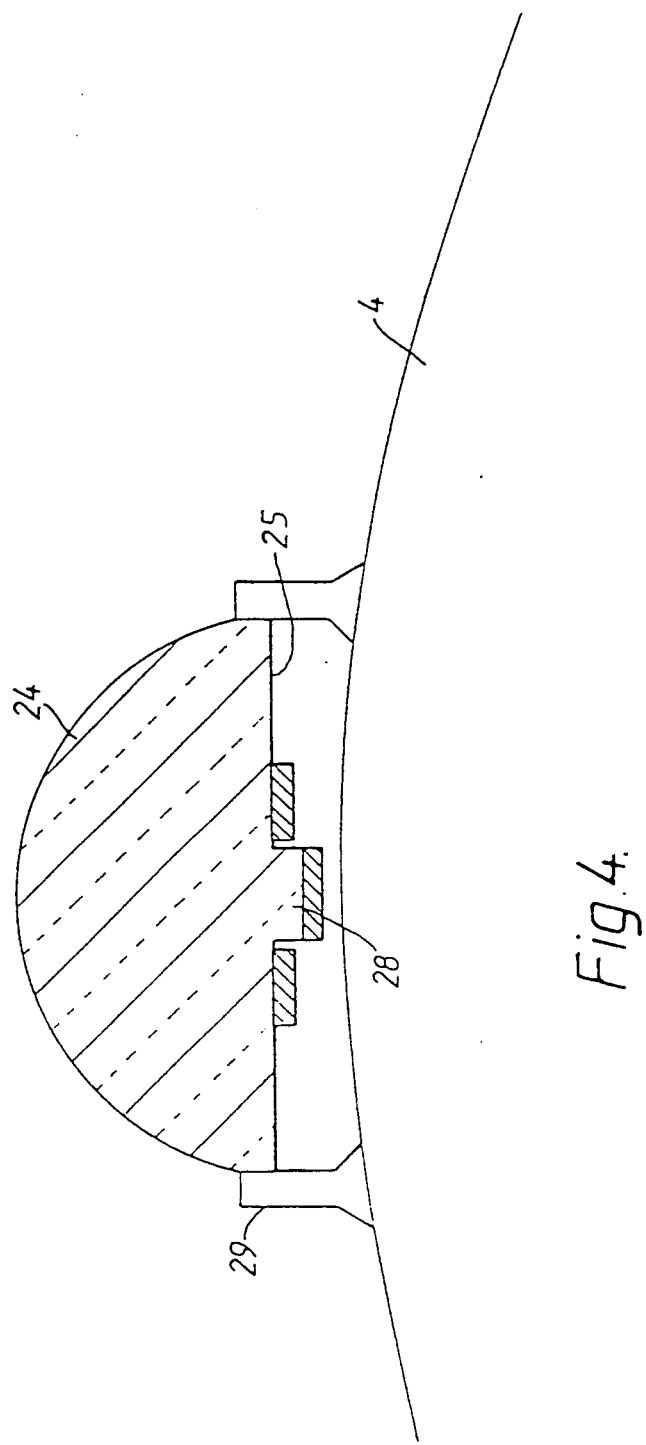
FIG. 4 is a section through a lens and sensor array mounted on a helmet.

The sensors may also be used in conjunction with a solid, hemispherical lens as shown in FIGS. 3A to 4. Three of the sensors are fixed to a substantially planar surface 25 and the fourth sensor fixed in a recess 27 or, alternatively as shown in FIG. 4, on a projection 28 which is made of material having the same refractive index as the lens 24.

The sensitive surfaces of the sensors are uppermost and the lens 24 directs the interference pattern onto the sensors whatever the orientation of the helmet 4 to which the lens 24 and sensor array is fixed by a locating ring 29 as shown in FIG. 4.

Figure 5A:
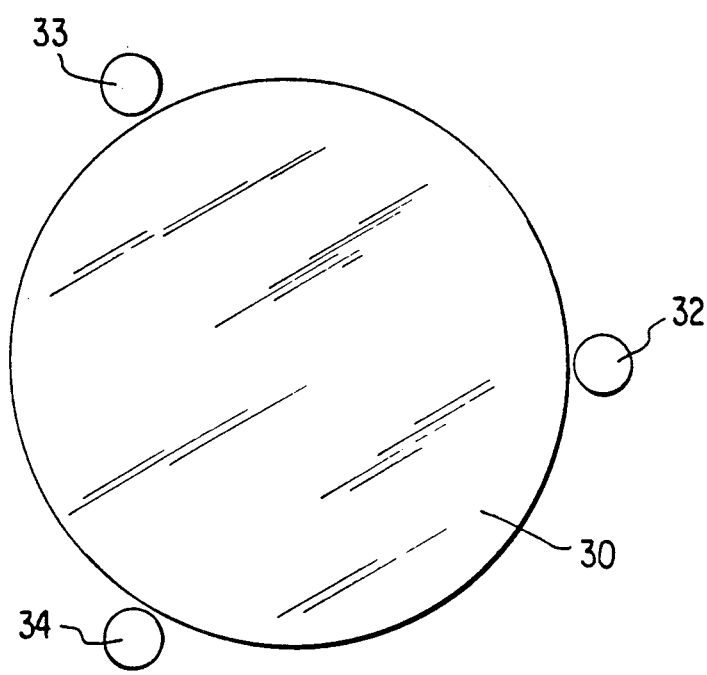
FIG. 5 A, B shows an alternative sensor array.
Figure 5B:
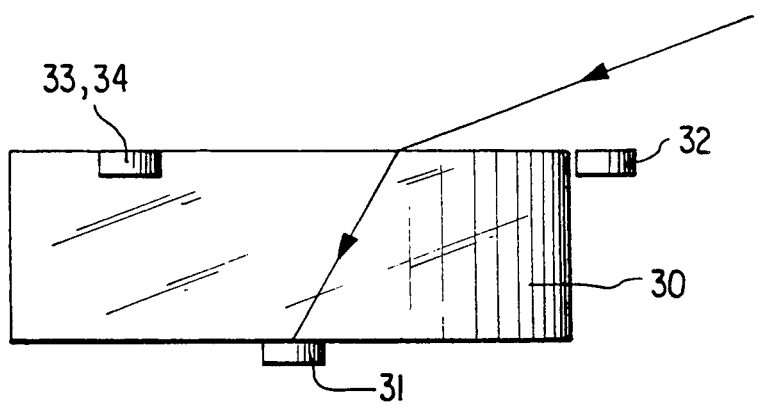

The incorporation of a lens in the sensor unit as shown in FIG. 4, results in a complex mathematical relationship between the measured phases from the photodetectors and the angular orientation of the interference pattern. In an alternative embodiment widefield sensor unit, which minimises the complexity of calculation, is shown in FIG. 5A, B. This makes use of a plane, parallel-sided transparent disc 30 placed in front of, and in physical contact with, the central photodetector 31. The other three photodetectors 32, 33 and 34 are equally spaced around the periphery of disc 30, close to the plane surface opposite to that in contact with photodetector 31. Light incident at an oblique angle on photodetectors 32, 33 and 34 is also incident on the front face of the disc 30 where it is refracted into the interior of the disc and strikes detector 31. As a result of refraction at the front face of the disc 30, detector 31 is able to detect signals from the interference pattern, even when the angle of incidence of the incoming light is close to 90 degrees. The sensor unit therefore has a wide field of view. Calculation of the relationship between phases of signals from the detectors and the orientation of the interference fringes, is simplified by the presence of only one plane refracting surface.

If the axis of the sensor unit is defined as the line joining photodetector 31 to a point equidistant between photodetectors 32, 33 and 34, and that the lines joining photodetectors 32, 33 and 34 to 31 are mutually perpendicular, it can be shown that the angle of elevation of the sensor axis with respect to fringes parallel to the x-plane is $$\theta_x = \arcsin\left[\frac{N(\phi_{x1} + \phi_{x2} + \phi_{x3})}{\sqrt{3}\ (\phi_{x1}^2 + \phi_{x2}^2 + \phi_{x3}^2)^{\frac{1}{2}}}\right]$$

where $\phi_{x1}$, $\phi_{x2}$, $\phi_{x3}$ are the phases of signals from photodetectors 32, 33 and 34 relative to that from photodetector 31 at a frequency equal to the modulation frequency of fringes in the x-plane, and N is the refractive index of transparent disc 30. Similarly the angle of elevation of the sensor axis with respect to fringes parallel to the y-plane is $$\theta_y = \arcsin\left[\frac{N(\phi_{y1} + \phi_{y2} + \phi_{y3})}{\sqrt{3}\ (\phi_{y1}^2 + \phi_{y2}^2 + \phi_{y3}^2)^{\frac{1}{2}}}\right]$$

where $\phi_{y1}$, $\phi_{y2}$, $\phi_{y3}$ are the phases of signals from photodetectors 32, 33 and 34 relative to that from photodetectors 31 at a frequency equal to the modulation frequency of fringes in the y-plane. The combination of the two angles $\theta_x$ and $\theta_y$ define the pointing direction of the sensor axis in space.

In alternative embodiments of the invention the sensor array may be arranged with more than one sensor recessed into or placed above the planar surface of the directing means. What is important is that not all the sensors are placed in the same plane.

Although the invention has been described in relation to a pilot's helmet it would also be suitable for the measurement of the orientation of other objects such as robots or scanning mirrors.

I claim:

1. Apparatus for monitoring the orientation of an object comprising means for illuminating the object with a first interference pattern moving in a first direction and a second interference pattern moving in a second direction at an angle to the first direction; an array of sensors arranged to be mounted on the object and to produce outputs in response to the interference patterns and means to derive from the outputs and known configuration of the array alone the orientation of the object.

2. Apparatus as claimed in claim 1 wherein the configuration of the array of sensors is a tetrahedron.

3. Apparatus as claimed in claim 2 wherein angles subtended at a first sensor by each pair of the other sensors are substantially right angles.

4. Apparatus as claimed in claim 3 wherein three of the sensors are on the surface of the object and the fourth is above the surface of the object.

5. Apparatus as claimed in claim 1 wherein the means for illuminating illuminates substantially the whole volume within which the object moves.

6. Apparatus as claimed in claim 1 wherein the interference pattern is produced by three beams of radiation, each beam being of a frequency of radiation different to the others.

7. Apparatus as claimed in claim 1 wherein the outputs are filtered at frequencies equal to the differences in the frequencies producing the interference patterns to produce filtered outputs which are then compared to determine the orientation of the object.

8. Apparatus as claimed in claim 1 wherein the object is a helmet.

9. Apparatus as claimed in claim 1 wherein the interference patterns are optical interference patterns of Infra-Red radiation of a wavelength chosen not to interfere with night vision equipment.

10. Apparatus as claimed in claim 1 wherein the directing means is provided to direct the interference patterns onto at least one of the sensors.

11. Apparatus as claimed in claim 10 wherein the directing means has at least one substantially planar surface.

12. Apparatus as claimed in claim 10 wherein the directing means is a lens.

13. Apparatus as claimed in claim 12 wherein the lens is substantially hemispherical.

14. Apparatus as claimed in claim 13 wherein three of the sensors are positioned on a substantially planar surface of the lens.

15. Apparatus as claimed in claim 14 wherein the fourth sensor is placed in a recess in the substantially planar surface.

16. Apparatus as claimed in claim 14 wherein the fourth sensor is placed on a projecting portion of the substantially planar surface of the lens.

17. Apparatus as claimed in claim 11 wherein the directing means has at least two substantially planar surfaces.

18. Apparatus as claimed in claim 17 wherein at least one sensor is placed on a substantially planar surface of the directing means.

19. Apparatus as claimed in claim 18 wherein three sensors are placed about a periphery of and substantially level to the planar surface of the directing means.

20. Apparatus as claimed in claim 19 wherein a fourth sensor is placed in a recess in the substantially planar surface.

21. Apparatus as claimed in claim 19 wherein a fourth sensor is placed above the substantially planar surface.

22. A sensor array comprising at least four sensors for use in apparatus for monitoring the orientation of an object to which in use the said array is mounted which apparatus comprising means for illuminating said object with a first interference pattern moving in a first direction and a second interference pattern moving in a second direction at an angle to said first direction and means to derive from outputs produced by said sensors in response to said interference patterns and known configuration of said array alone the orientation of said object.

23. A sensor array as claimed in claim 22 wherein the directing means is a lens.

24. A sensor array as claimed in claim 23 wherein the lens is a substantially hemispherical lens having a substantially planar surface.

25. A sensor array as claimed in claim 24 wherein at least one sensor is placed in a recess in the planar surface and the remaining sensors are placed on the surface.

26. A sensor array as claimed in claim 24 wherein at least one sensor is placed above the substantially planar surface and the remaining sensors are placed on the surface.

27. A sensor array as claimed in claim 22 wherein the directing means has at least two substantially planar surfaces and at least one sensor is placed on one of the surfaces.

* * * * *